(12) United States Patent  (10) Patent No.: US 9,266,500 B2
Brand et al.  (45) Date of Patent: Feb. 23, 2016

(54) METHOD AND EVALUATION SYSTEM FOR SUPERVISING CORRECT BELT UTILIZATION

(71) Applicant: AUDI AG, Ingolstadt (DE)

(72) Inventors: Martin Brand, Ingolstadt (DE); Philip Rigley, Hamburg (DE); Walter Settgast, Lenting (DE); Heiko Kuebler, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/374,422

(22) PCT Filed: Oct. 19, 2012

(86) PCT No.: PCT/EP2012/004395
§ 371 (c)(1),
(2) Date: Jul. 24, 2014

(87) PCT Pub. No.: WO2013/110298
PCT Pub. Date: Aug. 1, 2013

(65) Prior Publication Data
US 2015/0046041 A1  Feb. 12, 2015

(30) Foreign Application Priority Data
Jan. 26, 2012 (DE) .......................... 10 2012 001 472

(51) Int. Cl.
B60R 22/48 (2006.01)
B60R 16/02 (2006.01)

(52) U.S. Cl.
CPC ............... B60R 22/48 (2013.01); B60R 16/02 (2013.01); B60R 2022/4816 (2013.01); B60R 2022/4858 (2013.01); B60R 2022/4866 (2013.01)

(58) Field of Classification Search
CPC B60R 16/02; B60R 22/48; B60R 2022/4816; B60R 2022/4858; B60R 2022/4866
USPC ............................................................ 701/45
See application file for complete search history.

(56) References Cited

U.S. PATENT DOCUMENTS 3,860,904 A * 1/1975 Andersen ................ B60R 22/48
 180/269
6,204,569 B1 3/2001 Specht
(Continued)

FOREIGN PATENT DOCUMENTS

CN 202123951 1/2012
DE 19641548 A1 4/1998
(Continued)

OTHER PUBLICATIONS

WIPO provided English translation of the International Preliminary Report on Patentability uploaded on the WIPO website on Jul. 26, 2014 for corresponding International Patent Application No. PCT/EP2012/004395.
(Continued)

Primary Examiner — Khoi Tran
Assistant Examiner — Robert Nguyen
(74) Attorney, Agent, or Firm — Staas & Halsey LLP

(57) ABSTRACT

A method and an evaluation system supervise correct belt utilization of at least one safety belt in a motor vehicle, the open and/or closed belt lock state being supervised at the respective belt lock of a vehicle seat occupied by a person and a warning signal being given and/or the safety system of the motor vehicle being influenced if an unclosed belt lock is detected. In particular, feigned belt utilization is also detected by evaluating the temporal sequence of belt lock actuations with respect to further operations and/or states determined in the motor vehicle.

15 Claims, 3 Drawing Sheets

(56) References Cited

U.S. PATENT DOCUMENTS

| | | |
|---|---|---|
| 6,362,734 B1 | 3/2002 | McQuade et al. |
| 2003/0137411 A1 | 7/2003 | Hagenbuch |
| 2004/0204809 A1 | 10/2004 | Balzer |
| 2007/0182534 A1* | 8/2007 | Gregory .................. B60R 22/48 340/457.1 |
| 2007/0222572 A1 | 9/2007 | Downey et al. |
| 2009/0289443 A1 | 11/2009 | Okezie |
| 2010/0283593 A1 | 11/2010 | Miller et al. |

FOREIGN PATENT DOCUMENTS

| | | |
|---|---|---|
| DE | 19836197 A1 | 2/2000 |
| DE | 10203139 A1 | 8/2002 |
| DE | 10144878 A1 | 9/2002 |
| DE | 10123472 A1 | 11/2002 |
| DE | 10247870 A1 | 11/2003 |
| DE | 10307878 A1 | 9/2004 |
| DE | 102009011609 A1 | 9/2010 |
| DE | 102009058753 A1 | 6/2011 |
| DE | 102010029790 A1 | 12/2011 |
| WO | 85/04628 | 10/1985 |

OTHER PUBLICATIONS

Office Action issued Jul. 11, 2012 for corresponding German Patent Application No. 10 2012 001 472.4.

International Search Report mailed Dec. 13, 2012 for corresponding International Patent Application No. PCT/EP2012/004395.

Chinese Office Action for related Chinese Patent Application No. 201280068180.6, issued Sep. 21, 2015, 5 pages.

\* cited by examiner

Fig. 3

Processor          Belt Lock State Counter

METHOD AND EVALUATION SYSTEM FOR SUPERVISING CORRECT BELT UTILIZATION

CROSS REFERENCE TO RELATED APPLICATIONS

This application is based on and hereby claims priority to International Application No. PCT/EP2012/004395 filed on Oct. 19, 2012 and German Application No. 10 2012 001 472.4 filed on Jan. 26, 2012, the contents of which are hereby incorporated by reference.

BACKGROUND

The invention relates to a method for supervising correct belt utilization in a motor vehicle and to an evaluation system for carrying out this method.

It is a legal provision that the occupants of motor vehicles use safety belts during the journey, which is why corresponding supervising systems are installed in modern motor vehicles, which supervising systems detect whether the belt tongue of the associated safety belt has been correctly inserted into the belt lock at a vehicle seat occupied by a person. If the known supervising systems determine that the belt tongue of the associated safety belt is not inserted in the belt lock at a vehicle seat used by a person, a warning signal is given at recurring intervals of time during the journey until the belt tongue of the safety belt has been inserted into the belt lock.

The correct fastening of a safety belt is important in modern motor vehicles not only owing to the restraining function of the safety belt in the event of an accident but also for reasons of safety with regard to operation of airbag systems and driver assistance systems which is as safe as possible. For example, an adaptive cruise control system with a so-called stop-and-go function or with a congestion assistance system can be used with the required safety margin for the driver or else passenger only when these persons have also actually fastened the safety belts.

Since some drivers or occupants of motor vehicles do not have safety awareness for fastening the safety belt, these persons often insert a so-called dummy belt in the form of a sheet metal strip or a truncated belt tongue into the belt lock during daily vehicle use in order to thus feign use of the safety belt. This manipulation of the belt lock or else manipulation of the belt lock electrics decommissions the request to wear a belt in the vehicle. As a result, the conventional safety system of the motor vehicle also incorrectly determines that a belt is being used even though only a dummy belt has been inserted into the belt lock, for example. As a result, the vehicle safety system cannot adapt its safety strategies for operating adaptive driver assistance systems and for airbag control to the situation "belt not fastened". Systems for detecting the presence of the driver are canceled, which results in incorrect vehicle safety strategies and therefore in increased danger.

In order to detect the seat occupancy of a vehicle seat and, in particular, of the driver's seat in a motor vehicle, seat occupancy sensors or other occupant detection systems can be used, as stated in DE 101 23 472 A1. Such detection systems may also comprise belt sensors which supervise the insertion of the belt tongue into the belt lock, as is known from DE 10 2009 011 609 A1. However, these known systems are not suitable for detecting feigned belt utilization in which a belt tongue is inserted into the belt lock of an occupied vehicle seat without using the safety belt.

US 2009/289443 A1 also discloses a method for supervising belt utilization, which supervises the open and/or closed belt lock state, in which case belt or belt lock sensors are used for this purpose.

SUMMARY

One possible object is to specify a method for supervising correct belt utilization, which can detect feigned belt utilization in a manner that is as simple as possible. In addition, another possible object relates to specifying an evaluation system which can be used to carry out the method.

The inventors propose a method for the detection of feigned belt utilization by evaluating the temporal sequence of belt lock actuations with respect to further operations and/or states determined in the motor vehicle. Different detection strategies are conceivable in this case which are substantially based on the fact that illogical belt lock actuations, which also include permanent belt lock actuation, are used at least as an indication of a safety belt which has not been fastened correctly. Such illogical belt lock actuation involves, for example, the belt lock being permanently closed even though the engine is switched off, the driver's seat is no longer occupied and the driver's door is closed from the outside. In this case, an important advantage of the method is that there is no need for any additional sensors or other additional components for carrying out the method. Rather, it suffices to evaluate existing event information and/or state information, which is transmitted to the vehicle controller anyway via a data bus for example, for the purpose of supervising and detecting feigned belt utilization.

A driver's door which has been unlocked from the outside with a belt lock which is already closed at the driver's seat can already indicate belt manipulation and can be detected, as such, by an evaluation system which may be part of the safety system of the motor vehicle.

The opening of the driver's door with subsequent driving can also indicate incorrect belt utilization if no actuation or state change of the belt lock can be determined in the corresponding period.

There is also an indication of belt manipulation when no state changes occur at the driver's belt lock over a plurality of driving cycles with opening and closing of the driver's door. In this case, correct belt utilization can be supervised using individual supervision criteria or else also by evaluating a plurality of different supervision criteria which are evaluated in the entire combination and are used to trigger corresponding warning signals and/or to influence vehicle safety systems.

The closing of a vehicle door from the outside in conjunction with a constantly closed belt lock likewise also indicates belt manipulation or belt lock manipulation.

In the method for detecting correct belt utilization, the temporal sequence of belt lock actuations can also be supervised. Opening of the safety belt with closing of the safety belt shortly afterward can thus indicate pseudo-use of the safety belt, in particular if very short belt lock opening times of shorter than five seconds, for example, are involved.

The method makes it possible to influence or deactivate the adaptive cruise control and/or start/stop systems, for example, when feigned belt utilization is detected if this is used to improve safety when the safety belt is not fastened.

In a corresponding manner, in the case of feigned belt utilization, the airbag systems can be actuated in such a manner that they provide a safety function which is as optimum as possible for the vehicle occupants despite safety belts not being used.

In the method, one preferred development provides for a corresponding identifier to be stored for detected feigned belt utilization, which identifier can be queried by the vehicle system the next time the engine is started and can be taken into account for controlling relevant safety systems. This stored identifier can also preferably be read by an external reader. Possible electrical manipulation of the belt lock sensor system can therefore be determined in a very simple manner during vehicle servicing.

The inventors also propose an evaluation system that has a memory or a belt lock state counter which stores the temporal sequence of opening and closing operations for at least one belt lock of the motor vehicle. Feigned belt utilization can be detected in conjunction with further vehicle events and/or vehicle states. The belt lock state counter can be used to determine, in particular, whether a status change from "belt closed" to "belt open" and vice versa has occurred. The belt lock state counter may preferably be integrated in the control device of the motor vehicle, with the result that there is no need for any additional control and/or storage device. The content of the memory and the state of the belt lock state counter can be read using a diagnostic system or another reader on the motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 shows one possible embodiment for the proposed evaluation system.

DETAILED DESCRIPTION OF THE PREFERRED EMBODIMENT

Figure 1:
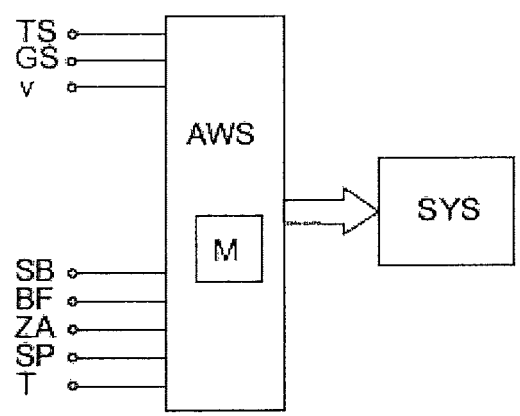
FIG. 1 shows a simplified block diagram for illustrating the interaction of the proposed evaluation system with the safety system of a motor vehicle.

Reference will now be made in detail to the preferred embodiments of the present invention, examples of which are illustrated in the accompanying drawings, wherein like reference numerals refer to like elements throughout.

The block diagram illustrated in FIG. 1 comprises an evaluation system AWS, to the input side of which door lock signals TS, belt lock signals GS and further signals indicating operations and/or states occurring in the motor vehicle are transmitted. These further signals include the current vehicle speed v, a seat occupancy signal SB, brake pedal and accelerator pedal signals BF, the ignition starter signal ZA, a key position signal SP indicating the local position of the vehicle key and a time signal T. All signals on the input side can be stored with a temporal assignment in a memory M which is arranged in the evaluation system AWS and can also be used to implement the function of a belt lock state counter. The evaluation system AWS can therefore subject the different signals to a logic check and can thereby determine, in particular, whether belt lock actuation or an existing belt lock state, for example a closed belt lock, indicates correct or manipulated belt utilization, taking into account the further signals TS, v, SB, BF, ZA, SP and T on the input side. If, for example with a constantly closed belt lock, a belt lock signal GS indicating this state is transmitted to the evaluation system AWS and a door signal TS indicating the closing of the vehicle door from the outside simultaneously occurs at the corresponding vehicle door, the evaluation system AWS can infer manipulated or feigned belt utilization therefrom and can inform the safety system SYS of the motor vehicle thereof. The safety system SYS can then switch off systems, for example, which would endanger the respective person(s) when the safety belt is not worn correctly.

Like the memory M, the evaluation system AWS may likewise be an integrated part of the control systems which are present in the motor vehicle anyway, with the result that detection in order to determine whether a safety belt is used correctly or only in a feigned manner is carried out by monitoring the temporal sequence of the signals TS, GS, v, SB, BF, ZA, SP and T. In this case, it is not absolutely necessary for all of these signals to be taken into account during their evaluation, but a particularly high degree of reliability is achieved when detecting whether or not there is feigned belt utilization by evaluating as many of these signals as possible since more sophisticated technical manipulation in connection with feigned belt utilization can also be uncovered thereby.

Figure 2:
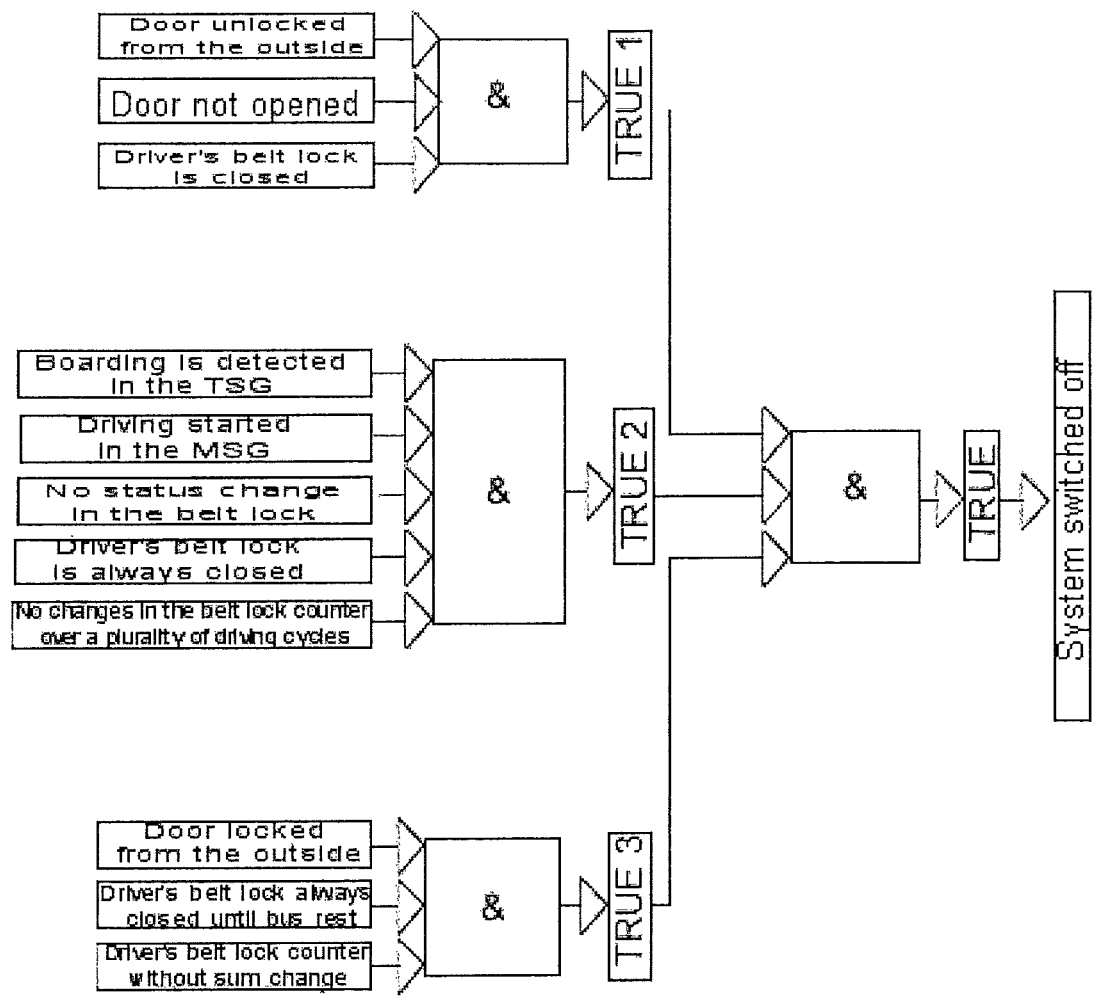
FIG. 2 shows a block diagram of combinational logic for explaining the proposed method.

A method for detecting feigned belt utilization is now described, by way of example, below using FIG. 2. In the exemplary embodiment illustrated here, different events and states in a motor vehicle are supervised using logical AND combinations 1, 2, 3. The AND combination 1 is used to check whether a door is unlocked from the outside and, if the door has not yet been opened, the driver's belt lock is already indicated as being closed. If this is true, the AND combination 1 results in a confirmation TRUE1 which already signals an indication of feigned belt utilization.

A further AND combination 2 is used to check whether a boarding operation is detected using a door lock control device TSG and driving has been started and there is no status change to the belt lock and the driver's belt lock is always closed and there are no counter reading changes in a belt lock counter over a plurality of driving cycles. If the logical AND combination 2 determines that all of these events and states are true, this results in a confirmation TRUE2 which signals a further indication of feigned belt utilization.

A further logical AND combination 3 is also used to supervise whether a door is locked from the outside and the driver's belt lock is always closed until the bus system has been switched off and no sum change can be determined in the driver's belt lock counter. If all of these events and states are true, the logical AND combination 3 results in a confirmation TRUE3 which signals a further indication of feigned belt utilization.

The confirmations TRUE1 to TRUE3 are supervised using a fourth AND combination 4, with the result that the confirmation TRUE is derived overall only when the confirmations TRUE1 to TRUE3 are present at the same time, which confirmation TRUE then results in systems being switched off and/or influenced in the safety system of the motor vehicle. If the confirmation TRUE is present, the presence of feigned belt utilization is therefore inferred and the safety system of the motor vehicle is informed thereof. This cannot only result in safety systems used in the motor vehicle being switched off or changed but also in optical and/or acoustic warning signals being triggered.

However, in principle, it is also possible to already respectively use the confirmations TRUE1 to TRUE3 on their own to trigger optical and/or acoustic warning signals and/or to already intervene in comfort or safety systems of the motor vehicle on the basis thereof.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for supervising correct belt utilization of a safety belt in a motor vehicle, comprising:
   supervising belt lock state changes for a belt lock at a driver's seat of the motor vehicle, each belt lock state change being either a change from an open belt lock state to a closed belt lock state or a change from the closed belt lock state to the open belt lock state;
   emitting a warning signal and/or influencing a safety system of the motor vehicle if the open belt lock state is detected; and
   detecting feigned belt utilization at the driver's seat by evaluating the belt lock state changes with respect to door actuations in the motor vehicle, feigned belt utilization being detected if at least one of the following conditions is determined:
      a driver's door has been unlocked from outside the motor vehicle and the closed belt lock state already existed before the driver's door was opened;
      there is no belt lock state change in a time period from opening of the driver's door until starting driving;
      a plurality of driving cycles are detected without any belt lock state change, each driving cycle comprising opening and closing of the driver's door; and
      the closed belt lock state is maintained without a belt lock state change in a time period of from when the driver's door is locked from outside until a vehicle safety system has been entirely switched off.

2. The method as claimed in claim 1, wherein if changing from the closed belt lock state to the open belt lock state is followed in a predetermined period of time by changing from the open belt lock state to the closed belt lock state, pseudo belt utilization is assumed such that an otherwise-qualifying belt lock state change is disregarded.

3. The method as claimed in claim 2, wherein the predetermined period of time is less than or equal to five seconds.

4. The method as claimed in claim 1, wherein an adaptive cruise control is influenced or deactivated when feigned belt utilization is detected.

5. The method as claimed in claim 1, wherein a start/stop system is influenced or deactivated when feigned belt utilization is detected.

6. The method as claimed in claim 1, wherein an actuation of an associated airbag system is influenced when feigned belt utilization is detected.

7. The method as claimed in claim 1, wherein an identifier is stored in a memory for detected feigned belt utilization, and the identifier is queried each time an engine of the motor vehicle is started and is taken into account for controlling relevant safety systems.

8. The method as claimed in claim 1, wherein if there is no belt lock state change in the time period from opening of the driver's door until starting driving, feigned belt utilization is detected only if there are also the plurality of driving cycles without any belt lock state change.

9. The method as claimed in claim 1, wherein feigned belt utilization is detected only if all of the following conditions are determined:
   the driver's door has been unlocked from outside the motor vehicle and the closed belt lock state already existed before the driver's door was opened;
   there is no belt lock state change in the time period from opening of the driver's door until starting driving;
   a plurality of driving cycles are detected without any belt lock state change; and
   the closed belt lock state is maintained without a belt lock state change in the time period of from when the driver's door is locked from outside until the vehicle safety system has been entirely switched off.

10. The method as claimed in claim 1, wherein feigned belt utilization is detected if the driver's door has been unlocked from outside the motor vehicle and the closed belt lock state already existed before the driver's door was opened.

11. The method as claimed in claim 1, wherein feigned belt utilization is detected if there is no belt lock state change in the time period from opening of the driver's door until starting driving.

12. The method as claimed in claim 1, wherein feigned belt utilization is detected if a plurality of driving cycles are detected without any belt lock state change.

13. The method as claimed in claim 1, wherein feigned belt utilization is detected if the closed belt lock state is maintained without a belt lock state change in the time period of from when the driver's door is locked from outside until the vehicle safety system has been entirely switched off.

14. An evaluation system, comprising:
   a processor to receive a belt lock signal reporting an open belt lock state or closed belt lock state to the evaluation system; and
   a belt lock state counter to count, based on the belt lock signal, belt lock state changes for a belt lock at a driver's seat of the motor vehicle, each belt lock state change being either a closing operation to change from the open belt lock state to the closed belt lock state or an opening operation to change from the closed belt lock state to the open belt lock state, the belt lock state counter identifying a temporal sequence of opening and closing operations for a belt lock, wherein the processor:
   causes a warning signal to be emitted and/or influences a safety system of the motor vehicle if the open belt lock state is detected;
   evaluates belt lock state changes taking into account door lock actuations and further events and states of the motor vehicle; and
   detects feigned belt utilization at the driver's seat, feigned belt utilization being detected if at least one of the following conditions is determined:
      a driver's door has been unlocked from outside the motor vehicle and the closed belt lock state already existed before the driver's door was opened;
      there is no belt lock state change in a time period from opening of the driver's door until starting driving;
      a plurality of driving cycles are detected without any belt lock state change, each driving cycle comprising opening and closing of the driver's door; and
      the closed belt lock state is maintained without a belt lock state change in a time period of from when the driver's door is locked from outside until a vehicle safety system has been entirely switched off.

15. The evaluation system as claimed in claim 14, further comprising a memory to store an identifier which indicates feigned belt utilization and can be queried from the memory for control purposes and/or when carrying out service work.

* * * * *